(12) United States Patent
Cermak

(10) Patent No.: US 7,811,176 B2
(45) Date of Patent: Oct. 12, 2010

(54) WHEEL HUB/UNIVERSAL JOINT ASSEMBLY WITH SECURING RING FOR AXIALLY SUPPORTING THE CLAMPING MEANS

(75) Inventor: Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 357 days.

(21) Appl. No.: 11/782,391

(22) Filed: Jul. 24, 2007

(65) Prior Publication Data
US 2008/0018170 A1  Jan. 24, 2008

(30) Foreign Application Priority Data
Jul. 24, 2006  (DE) .................. 10 2006 034 038

(51) Int. Cl.
*F16C 13/00* (2006.01)
(52) U.S. Cl. .................... 464/178; 403/359.5
(58) Field of Classification Search ............. 464/178, 464/906; 384/542, 544, 589; 301/105.1; 403/359.5
See application file for complete search history.

(56) References Cited

U.S. PATENT DOCUMENTS

| | | | | |
|---|---|---|---|---|
| 2,844,013 | A * | 7/1958 | Spence | 403/359.5 X |
| 3,239,281 | A * | 3/1966 | White | |
| 5,667,332 | A * | 9/1997 | Lindholm | 403/359.5 |
| 6,550,975 | B2 | 4/2003 | Inoue et al. | |
| 6,715,926 | B2 * | 4/2004 | Tajima et al. | 384/544 |
| 6,821,208 | B2 | 11/2004 | Krude et al. | |
| 6,851,865 | B2 * | 2/2005 | Nomura et al. | 384/544 |
| 2004/0120622 | A1 | 6/2004 | Tajima et al. | |
| 2007/0135220 | A1 | 6/2007 | Welschof | |

FOREIGN PATENT DOCUMENTS

| | | |
|---|---|---|
| CN | 1460074 A | 12/2003 |
| EP | 0 936 086 A2 | 8/1999 |
| WO | WO-2006/050784 A2 | 5/2006 |

* cited by examiner

*Primary Examiner*—Greg Binda
(74) *Attorney, Agent, or Firm*—Rader, Fishman & Grauer, PLLC

(57) ABSTRACT

A wheel hub/universal joint assembly (11) comprising a rotatably supported wheel hub (21) which is provided with a wheel flange (22) for bolting on a vehicle wheel and which comprises a central through-aperture (29) with inner shaft teeth (30), and a universal joint (41) with an outer joint part (42) to which there is attached a driving journal (43) with outer shaft teeth (53), wherein the driving journal (43) is inserted into the through-aperture (29) and wherein the wheel hub (21) and the outer joint part (42) are connected to one another in a rotationally fast way by inter-engaging inner and outer shaft teeth (30, 53), and wherein, between the wheel hub (21) end facing the joint and an end face (50) of the outer joint part (42), which end face (50) faces the wheel, there is provided an axial free space (81), wherein between the wheel hub (21) and the driving journal (43), there includes a clamping element which load the wheel hub (21) towards the outer joint part (42) and wherein, for supporting the wheel hub (21) on the driving journal (43), a securing ring (86) is inserted into an outer annular groove (85) against which there rests an end face of an inner widening (32) in the wheel hub (21).

19 Claims, 5 Drawing Sheets

WHEEL HUB/UNIVERSAL JOINT ASSEMBLY WITH SECURING RING FOR AXIALLY SUPPORTING THE CLAMPING MEANS

TECHNICAL FIELD

The invention relates to a wheel hub/universal joint assembly comprising a rotatably supported wheel hub, which includes a wheel flange for bolting on a vehicle wheel, a central through-aperture with inner shaft teeth, and a universal joint including an outer joint part to which there is attached a driving journal with outer shaft teeth. The driving journal is inserted into the through-aperture. The wheel hub and the outer joint part are connected to one another in a rotationally fast way by inter-engaging inner and outer shaft teeth. Between the wheel hub end and an end face of the outer joint part facing the wheel, there is provided an axial free space.

BACKGROUND OF THE INVENTION

From the Applicant's U.S. Pat. No. 6,821,208, there is known a wheel hub/universal joint assembly wherein between the wheel hub end and the end face of the outer joint part, there is an axially open annular gap. In the case of relative torsional movements between the wheel hub and the outer joint part under a torque load, undesirable noise due to a contact offset cannot occur due to the annular gap. Centering between the free end of the wheel hub and the journal base of the driving journal is effected by a centering collar in the region of the journal base. To ensure relative axial security between the wheel hub and the driving journal, there is provided an axial securing ring which engages an inner groove in the wheel hub and an outer groove in the journal end of the driving journal, which ensures relative axial security in both directions.

To permit the universal joint, and thus the driveshaft connected thereto, to be removed from the wheel hub, the driving journal requires complex engagement configurations. The outer groove must be configured to have a certain depth. The journal end is configured with a central aperture and a longitudinal slot in the journal. The free ends of the securing ring divided at the circumference, are bent inwardly so that they can be handled by a tool.

From the Applicant's U.S. Publication No. 2007/135220 (A1), there is known an assembly similar to the above-mentioned type wherein the wheel hub is axially clamped relative to the outer joint part by a bolt which is threaded into the driving journal. The bolt includes a bolt head supported on the wheel hub. Directly between the wheel hub end (facing the wheel) and an end face of the outer joint part (facing the wheel) there is provided an axial free space. The wheel hub, however, is axially supported via inner bearing races of a wheel bearing on the outer joint part in a play-free way.

SUMMARY OF THE INVENTION

The present invention provides a wheel hub/universal joint assembly wherein the axial securing means are simplified.

The present invention accomplishes this by including, between the wheel hub and the driving journal, a clamping element which loads the wheel hub towards the outer joint part. In addition, for supporting the wheel hub on the driving journal, a securing ring is inserted into an outer annular groove against which there rests an end face of an inner widened region in the wheel hub. The present invention provides advantages by preserving the axial distance between the wheel hub end, facing the joint, and the end face of the outer joint part, facing the wheel, so that, under torsional loads, relative rotations and a contact offset of surfaces under contact tension cannot occur. The securing ring which, in one embodiment, is provided in the form of a freely rotatable round cross section ring, is positioned on a small diameter. Because of its design, the securing ring does not cause noise developments. The pretension of a separate inner bearing race or of two separate inner bearing races of a double-row wheel bearing can, is generated by a beading on the wheel hub. The pretensioning forces of such beading are in no way influenced by the subsequent production of the connection between the wheel hub and the driving journal.

According to the design of a first embodiment, it is proposed that the clamping element comprises a bolt which is axially threaded into the driving journal and which, by means of its bolt head, is supported on the wheel hub. More particularly, it is proposed that the bolt head is supported on a disc which, in turn, rests on the wheel hub. Alternatively, it is also conceivable for the bolt head to be supported on a recess in the through-aperture.

According to a second embodiment, it is proposed that the clamping element comprises a further securing ring which is inserted into a further outer annular groove in the driving journal and which rests against an end face of the wheel hub, which end face points towards the end of the inwardly projecting driving journal. More particularly, it is proposed that, in a cross-sectional view, the further outer annular groove is inwardly wedge-shaped and that the further securing ring comprises at least one inner portion with a wedge-shaped cross-section. This achieves a tolerance-equalising effect which ensures that the assembly does not comprise any axial play. It is particularly advantageous that the further securing ring is radially secured by an annular cap slid-on after the further securing ring has been inserted into the further outer annular groove.

The embodiments listed here ensure a simple design of the clamping element between the wheel hub and the driving journal. Advantages are realized using a simple securing ring for axially supporting the wheel hub at an axial distance from the outer joint part. The securing ring engages an outer circumferential groove in the driving journal and directly rests against an end face of the wheel hub.

These and other features and advantages of this invention will become more apparent to those skilled in the art from the detailed description of a preferred embodiment. The drawings that accompany the detailed description are described below.

BRIEF DESCRIPTION OF THE DRAWINGS

The invention can be better understood on reading the following description given purely by way of example and made with reference to the accompanying drawing.

DETAILED DESCRIPTION OF A PREFERRED EMBODIMENT

Figure 1:
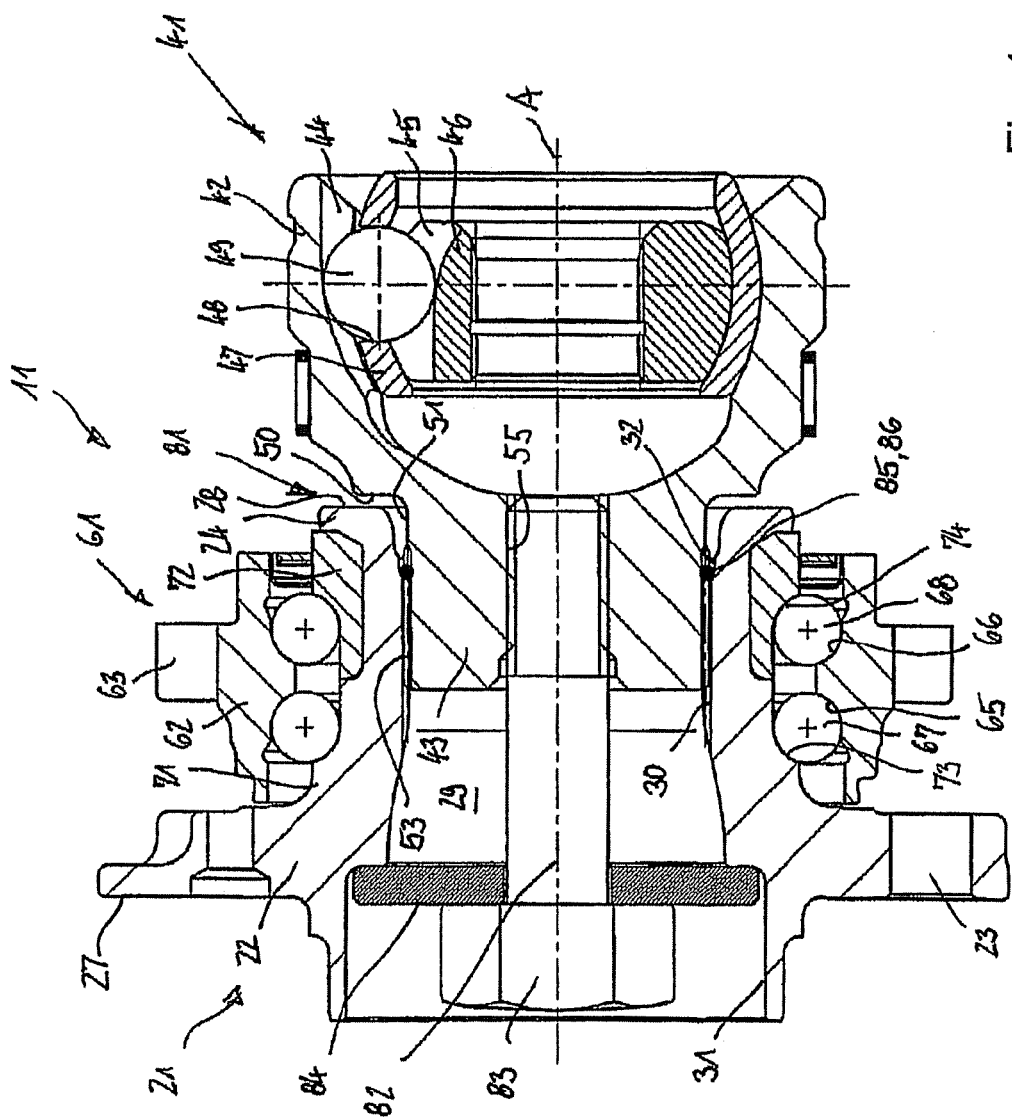
FIG. 1 is a longitudinal section of an inventive wheel hub/universal joint assembly in a first embodiment.
Figure 2:
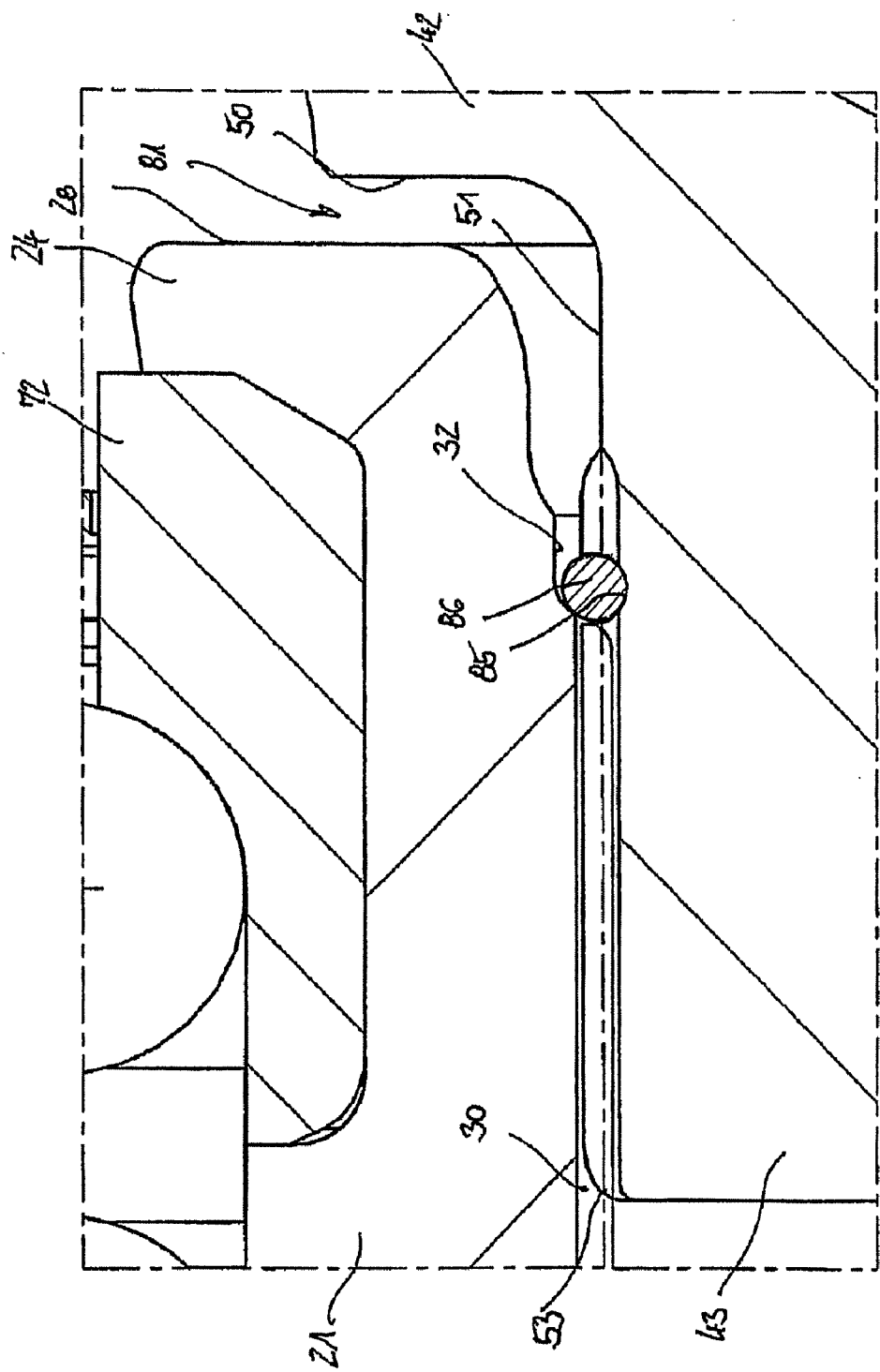
FIG. 2 shows an enlarged detail of a portion of the wheel hub/universal joint assembly illustrated in FIG. 1.

FIGS. 1 and 2 which correspond to one another as far as the subject matter is concerned will be described jointly below. They show a longitudinal section of an inventive wheel hub/universal joint assembly 11 whose main components are a wheel hub 21 with a formed-on wheel flange 22, a torque transmitting universal joint 41 with an outer joint part 42 with a formed-on driving journal 43 and a wheel bearing 61 slipped on to the wheel hub 21. The common longitudinal axis of the wheel hub 21, the outer joint part 42 and the wheel bearing 61 has been given the reference symbol A. With the exception of torque transmitting balls 49 and outer ball tracks 44 in the outer joint part 42 and inner ball tracks 45 in the inner joint part 46, which ball tracks 44, 45 are associated with one another as well as a ball cage 47 with circumferentially distributed cage windows 48, the components as illustrated are substantially rotationally symmetric relative to the longitudinal axis A. It should be understood that, with reference to the wheel bearing 61, the arrangement of the bearing balls and the design of the bearing cages, which has yet to be explained in greater detail, need not be perfectly rotationally symmetric.

The wheel bearing 61 comprises an outer bearing race 62 with a formed-on bearing flange 63 for bolting on a wheel carrier. The outer bearing race 62 comprises two outer ball grooves 65, 66 in which there run rings of bearing balls 67, 68. The wheel bearing 61 (rolling contact bearing) is completed by an inner bearing race 72 which may be produced so as to be integral with the wheel hub 21 or may be produced so as to be separate from said wheel hub 21 and axially slid on to the wheel hub 21 from the universal joint end. The inner bearing races 71, 72 form inner ball grooves 73, 74. On the side of the wheel hub 21 which is positioned axially opposite the wheel flange 22 of the wheel hub 21, there is provided a beading 24 which was produced by a beading operation only after the inner bearing race 71, the bearing balls 67, 78 and the outer bearing race 62 have been axially slid on and which axially clamps on the radial bearing 61. An outer joint end face 50 is positioned at an axial distance 81 from a wheel hub end face 28 of the beading 24. Thus, an axial free space is formed between the outer joint end face 50 of the outer joint part and the wheel hub end face 28 of the wheel hub.

The end of the assembly 11, which is characterised by the wheel flange 22 is referred to as the wheel end. The end of the assembly 11 characterised by the universal joint 41 is referred to as the joint end.

The driving journal 43 comprises a first region adjoining the end face 50, which first region, hereafter, is referred to as the journal base 51. This is followed by a further region with outer shaft teeth 53 which extend as far as the end of the driving journal 43. The wheel hub 21 comprises a through-aperture 29 which carries inner shaft teeth 30. The inner shaft teeth 30, at the wheel end, are followed by a widened region 31 of an internally cylindrical shape. At the joint end, there follows a widened region 32 of an internally cylindrical shape.

The above-described assembly which, by means of the bearing flange 63, can be bolted to a wheel carrier of a motor vehicle has to transmit driving moments from a sideshaft which, in a rotationally fast way, can be inserted into the inner joint part 44 and axially secured therein, to a vehicle wheel whose rim has to be bolted to the flange face 27 of the wheel flange 22. The universal joint 41 allows variable angular positions between the sideshaft and the wheel carrier, which result from compression and steering movements of the wheel carrier.

In FIG. 1, at the wheel end of the driving journal 43, the present invention includes a clamping element 77 engaging the wheel hub 21 axially to the driving journal 43. In this embodiment, the clamping element 77 comprises a bolt 82 threaded into a central threaded bore 55 of the driving journal 43. The bolt head 83 of the bolt 82, by means of a planar flank 184 (disc or washer), rests on an end face of the wheel hub 21 which is formed by a radial widened region 31 in the through-bore 29. In other contemplated embodiments, the bolt head 83 may be directly retained or supported by a recess 99 or other portion of the radial widened region 31.

A holding force acting against the pretensioning force of the bolt 82 is generated by a securing ring 86 which is inserted into an outer groove 85 in the driving journal 43 between the outer shaft teeth 53 and the journal base 51 and which is contacted by the end face of the internally cylindrical widened region 32 of the wheel hub. The securing ring is provided in the form of a round cross section ring and can easily be mounted before the driving journal 43 is inserted into the through-aperture 29 of the wheel hub.

Figure 3:
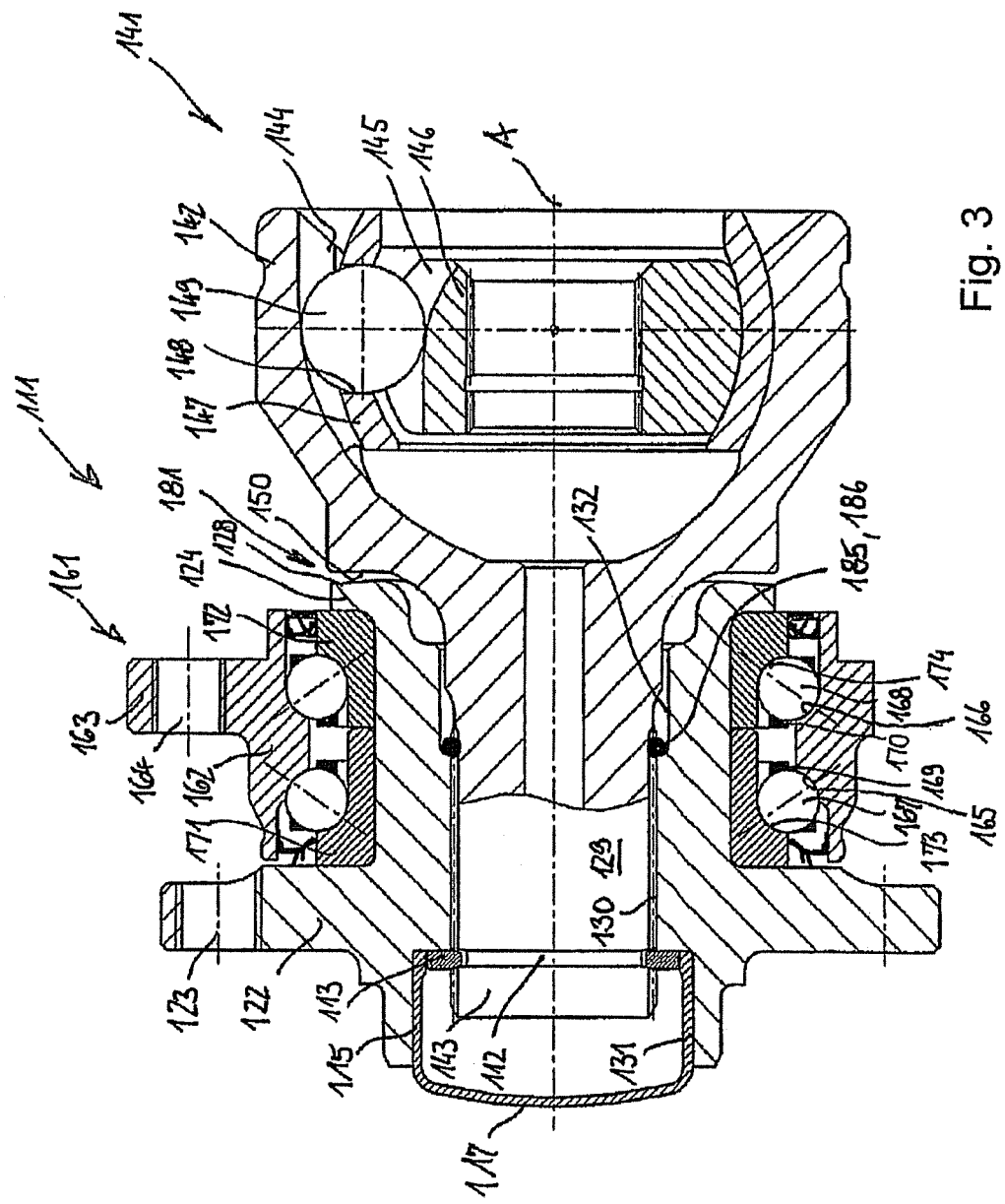
FIG. 3 is a longitudinal section through an inventive wheel hub/universal joint assembly in a second embodiment.
Figure 4:
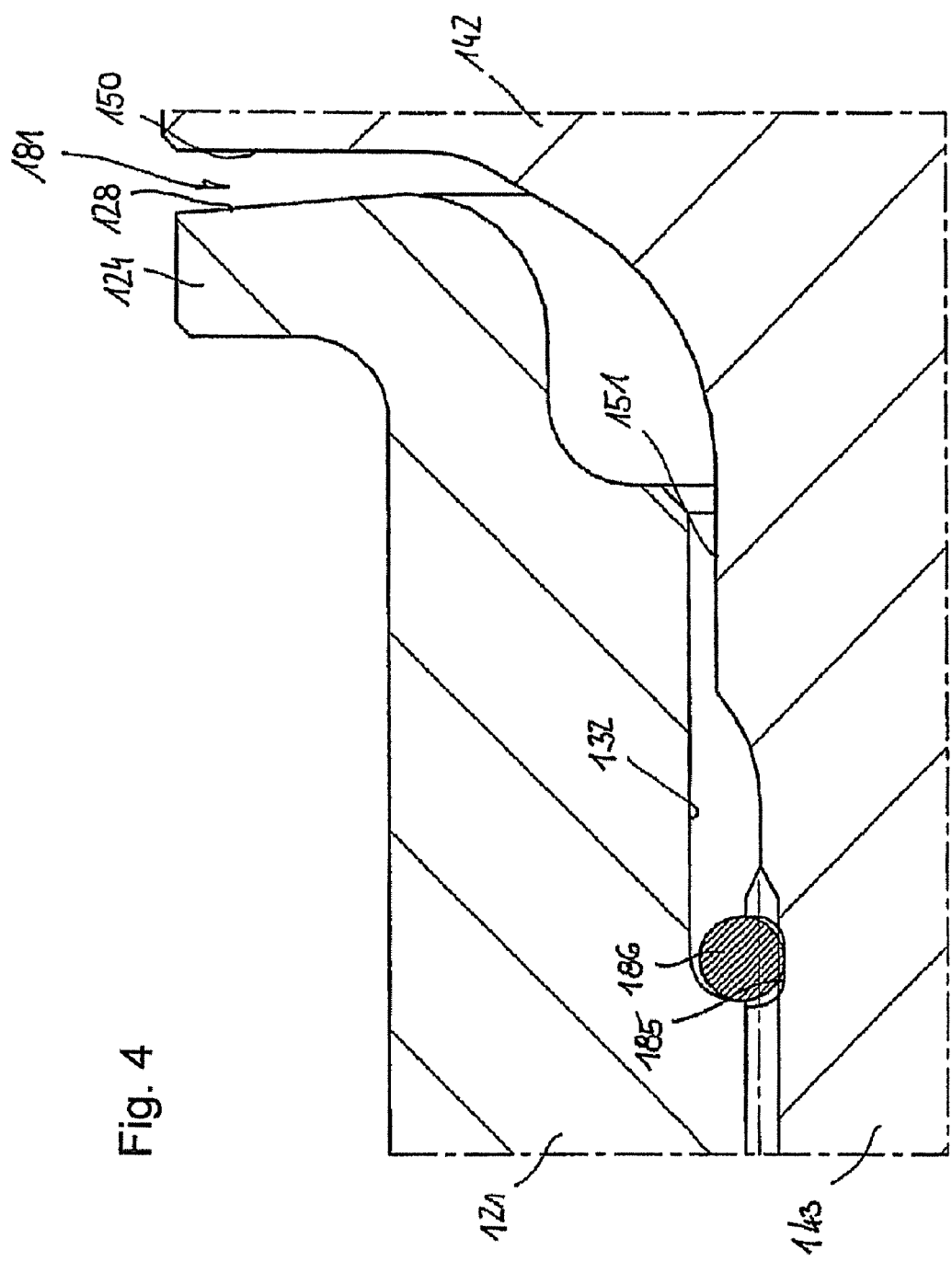
FIG. 4 is an enlarged detail of the securing ring illustrated in FIG. 3.
Figure 5:
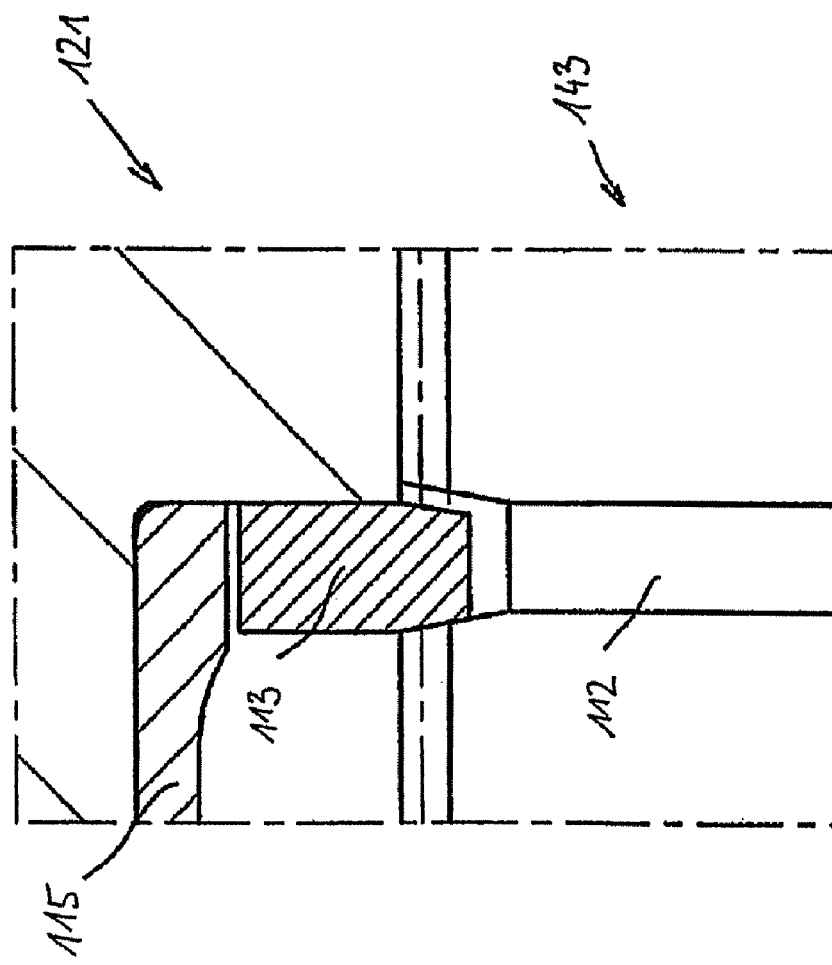
FIG. 5 shows an enlarged detail of the clamping element illustrated in FIG. 3.

FIGS. 3 to 5, which correspond to a second embodiment, will be described jointly below. They illustrate a longitudinal section of an inventive wheel hub/universal joint assembly 111 whose main components are a wheel hub 121 with a formed-on wheel flange 122, a torque transmitting universal joint 141 with an outer joint part 142 with a formed-on driving journal 143 and a wheel bearing 161 slipped on to the wheel hub 121. The common longitudinal axis of the wheel hub 121, the outer joint part 142 and the wheel bearing 161 has been given the reference symbol A. With the exception of torque transmitting balls 149 and outer ball tracks 144 in the outer joint part 142 and inner ball tracks 145 in the inner joint part 146, which ball tracks 144, 145 are associated with one another as well as a ball cage 147 with circumferentially distributed cage windows 148, the components as illustrated are substantially rotationally symmetric relative to the longitudinal axis A. It should be understood that, with reference to the wheel bearing 161, the arrangement of the bearing balls and the design of the bearing cages, need not be perfectly rotationally symmetric.

The wheel bearing 161 comprises an outer bearing race 162 with a formed-on bearing flange 163 for bolting on a wheel carrier. For this purpose, there are provided threaded holes 164. The outer bearing race 162 comprises two outer ball grooves 165, 166 in which there run rings of bearing balls 167, 168. The balls are spaced by bearing cages 169, 170. The wheel bearing 61 is completed by two inner bearing races 171, 172 which are axially slid on to the wheel hub 121 from the universal joint end. The inner bearing races 171, 172 form inner ball grooves 173, 174. At the end of the wheel hub 121 which is arranged axially opposite the wheel flange 122 of the wheel hub 121, there is provided a beading 124 which was produced by a beading operation only after the inner bearing races 171, 172, the bearing balls 167, 178 and the outer bearing race 163 have been axially slid on and which axially clamps on the radial bearing 161. An outer joint end face 150 of the outer joint part is positioned at an axial distance 181 from a wheel hub end face 128 of the beading 124. Thus, an axial free space is formed between the outer joint end face 150 of the outer joint part and the wheel hub end face 128 of the wheel hub.

The end of the assembly 11, which is characterised by the wheel flange 22 is referred to as the wheel end. The end of the assembly 11 characterised by the universal joint 41 is referred to as the joint end.

The driving journal 43 comprises a first region adjoining the end face 50, which first region, hereafter, is referred to as the journal base 51. This is followed by a further region with outer shaft teeth 53 which extend as far as the end of the driving journal 43. The wheel hub comprises a through-aperture 29 which carries inner shaft teeth 30. The inner shaft teeth 30, at the wheel end, are followed by a widened region 31 of an internally cylindrical shape. At the joint end, there follows a widened region 32 of an internally cylindrical shape.

The above-described assembly which, by means of the bearing flange 63, can be bolted to a wheel carrier of a motor vehicle has to transmit driving moments from a sideshaft—which, in a rotationally fast way, can be inserted into the inner joint part 44 and is axially secured therein—to a vehicle wheel whose rim has to be bolted to the flange face 27 of the wheel flange 22. The universal joint 41 allows variable angular positions between the sideshaft and the wheel carrier which result from compression and steering movements of the wheel carrier.

In FIG. 3, an alternate embodiment of clamping element 177 is provided. At the wheel end of the driving journal 143, which wheel end projects beyond the inner shaft teeth 130 of the wheel hub 121, there is cut in an outer groove 112 which comprises a wedge-shaped cross-section and into which there is inserted a clamp securing ring 113 whose cross-section, in its inner region, is also wedge-shaped. The clamp securing ring 113 is a standard spring ring divided at the circumference. Via a planar flank on the right-hand side, the clamp securing ring 113 rests against an end face of the wheel hub 121. On the left-hand side, by means of a wedge face, it rests against the corresponding wedge shape of the clamp outer groove 112. Because of its radial residual pretensioning force after having been widened and slid on up to the point of spring deflection in the clamp circumferential groove 112, the clamp securing ring 113 generates an axial pretensioning force acting on the wheel hub 122 which is supported on the driving journal 143 and acts towards the right, as a result of which the assembly is free of play in the axial direction. The clamp securing ring 113 is secured against being removed by a cylindrical plate metal cap 115 which, a short distance from its inner open end, comprises an inner annular fold 116 which axially rests against the securing ring. The formed-on base 117 ensures that, at the same time, the shaft teeth are protected from any dirt which may enter.

A holding force acting against the residual pretensioning force of the clamp securing ring 113 is generated by a securing ring 186 which is inserted into an outer groove 185 in the driving journal 143 between the outer shaft teeth 153 and the journal base 151, and which is contacted by the end face of the internally cylindrical widened region 132 of the wheel hub. The securing ring 186 is preferably provided in the form of a round cross section ring and can easily be mounted before the driving journal 143 is inserted into the through-aperture 129 of the wheel hub.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

The invention claimed is:

1. A wheel hub/universal joint assembly comprising:
   a rotatably supported wheel hub including a wheel flange adapted for bolting on a vehicle wheel, said rotatably supported wheel hub comprises a central through-aperture including inner shaft teeth; said central through-aperture comprising an inner widened region with an end face;
   a universal joint comprising an outer joint part and a driving journal including outer shaft teeth, said driving journal is positioned within said through-aperture, said wheel hub and said outer joint part connected to one another in a rotationally fast way by inter-engaging inner and outer shaft teeth;
   an axial free space formed between an outer joint end face of said outer joint part and a wheel hub end face of said wheel hub;
   a clamping element in communication with said wheel hub and said driving journal, said clamping element loading said wheel hub towards said outer joint part; and
   a securing ring positioned within an outer annular groove of said driving journal; said securing ring being held in an axial direction in said annular groove and projecting beyond an outer surface of said driving journal, which outer surface adjoins said annular groove, said end face of said inner widened region of said wheel hub resting against said securing ring so as to be axially supported by said securing ring.

2. An assembly according to claim 1, wherein said securing ring comprises a round cross section ring rotatably held in said outer annular groove.

3. An assembly according to claim 1, wherein said wheel hub end face is formed by a beading which axially rests against a slid-on inner bearing race of a rolling contact bearing held on said wheel hub.

4. An assembly according to claim 1, wherein said clamping element comprises a bolt axially threaded into said driving journal and includes a bolt head supported by said wheel hub.

5. An assembly according to claim 4, wherein said bolt head is supported on a disc which rests on said wheel hub.

6. An assembly according to claim 4, wherein said bolt head is supported on a recess in the through-aperture.

7. An assembly according to claim 1, wherein said clamping element comprises a clamp securing ring inserted into a clamp outer annular groove formed in said driving journal, said clamp securing ring resting against said wheel hub, and along said wheel hub towards said outer joint part.

8. An assembly according to claim 7, wherein said clamp outer annular groove is inwardly wedge-shaped and said clamp securing ring comprises at least one inner portion with a wedge-shaped cross-section.

9. An assembly according to claim 7, wherein said clamp securing ring is radially secured by an annular cap slid-on after said clamp securing ring has been inserted into said clamp outer annular groove.

10. A wheel hub/universal joint assembly comprising:
    a wheel hub comprising a central through-aperture including inner shaft teeth;
    a universal joint including a driving journal having outer shaft teeth, said driving journal positioned within said central through-aperture, said inner shaft teeth engaging said outer shaft teeth;
    an axial free space formed between an outer joint end face and a wheel hub end face;
    a clamping element in communication with said wheel hub and said driving journal, said clamping element biasing said wheel hub towards said driving journal; and
    a securing ring positioned within an annular groove, said securing ring being held in an axial direction in said annular groove and projecting beyond an outer surface of said driving journal, said securing ring in communication with said wheel hub and said driving journal, said securing ring opposing said clamping element bias so as to axially support the wheel hub relative to said driving journal.

11. An assembly according to claim 10, wherein said securing ring comprises a round cross section ring rotatably held in said outer annular groove.

12. An assembly according to claim 10, wherein said wheel hub end face is formed by a beading which axially rests against a slid-on inner bearing race of a rolling contact bearing held on said wheel hub.

13. An assembly according to claim 10, wherein said clamping element comprises a bolt axially threaded into said driving journal and includes a bolt head supported by said wheel hub.

14. An assembly according to claim 10, wherein said bolt head is supported on a disc which rests on said wheel hub.

15. An assembly according to claim 10, wherein said clamping element comprises a clamp securing ring inserted into a clamp outer annular groove formed in said driving journal, said clamp securing ring resting against said wheel hub, and along said wheel hub towards said driving journal.

16. An assembly according to claim 15, wherein said clamp outer annular groove is inwardly wedge-shaped and said clamp securing ring comprises at least one inner portion with a wedge-shaped cross-section.

17. An assembly according to claim 15, wherein said clamp securing ring is radially secured by an annular cap slid-on after said clamp securing ring has been inserted into said clamp outer annular groove.

18. A wheel hub/universal joint assembly comprising:

a wheel hub including a wheel flange adapted for bolting on a vehicle wheel, said wheel hub including a central through-aperture;

a universal joint comprising an outer joint part and a driving journal, said driving journal positioned within said central through-aperture and rotationally fast engaging said wheel hub;

a clamping element in communication with said wheel hub and said driving journal, said clamping element loading said wheel hub towards said outer joint part; and a securing ring positioned within an outer annular groove, said securing ring being held in an axial direction in said annular groove and projecting beyond an outer surface of said driving journal, said driving journal and said wheel hub resting against said securing ring so as to be axially supported against said securing ring.

19. A wheel hub/universal joint assembly as described in claim 18, further comprising: an axial free space formed between an outer joint end face and a wheel hub end face.

* * * * *